(12) United States Patent
Koyama et al.

(10) Patent No.: US 7,335,618 B2
(45) Date of Patent: Feb. 26, 2008

(54) METHOD FOR MANUFACTURING HYDROREFINING CATALYST, AND METAL RECOVERY METHOD

(75) Inventors: Hiroki Koyama, Toda (JP); Toru Saito, Toda (JP); Yoshiki Iwata, Toda (JP); Chikanori Nakaoka, Toda (JP)

(73) Assignee: Japan Energy Corporation, Tokyo (JP)

( * ) Notice: Subject to any disclaimer, the term of this patent is extended or adjusted under 35 U.S.C. 154(b) by 0 days.

(21) Appl. No.: 10/310,903

(22) Filed: Dec. 6, 2002

(65) Prior Publication Data

US 2003/0130118 A1 Jul. 10, 2003

Related U.S. Application Data

(63) Continuation of application No. PCT/JP01/04802, filed on Jun. 7, 2001.

(30) Foreign Application Priority Data

| | | |
|---|---|---|
| Jun. 8, 2000 | (JP) | ............................. 2000-171427 |
| Jul. 19, 2000 | (JP) | ............................. 2000-218139 |

(51) Int. Cl.
| | |
|---|---|
| *B01J 21/00* | (2006.01) |
| *B01J 29/00* | (2006.01) |
| *C01G 45/00* | (2006.01) |
| *C01G 39/00* | (2006.01) |

(52) U.S. Cl. ........................... 502/20; 502/21; 502/312; 502/315; 502/337; 502/353; 209/10; 241/3; 241/24.1; 241/24.14; 241/24.15

(58) Field of Classification Search ................ 502/312, 502/315, 21, 337, 353, 20; 241/3, 24.1, 24.14, 241/24.15; 209/10
See application file for complete search history.

(56) References Cited

U.S. PATENT DOCUMENTS

| | | | | |
|---|---|---|---|---|
| 4,212,771 A | * | 7/1980 | Hamner | ........................ 502/64 |
| 4,276,083 A | * | 6/1981 | Tolley et al. | ............... 75/10.67 |
| 4,280,839 A | * | 7/1981 | Tolley et al. | .................. 75/430 |
| 4,510,255 A | * | 4/1985 | Toulhoat et al. | ............... 502/10 |
| 4,537,875 A | * | 8/1985 | Toulhoat et al. | ............ 502/314 |
| 4,581,129 A | * | 4/1986 | Miller et al. | ............ 208/216 R |
| 4,721,606 A | * | 1/1988 | Tilley | ........................... 423/54 |
| 5,154,819 A | * | 10/1992 | Clark et al. | ............. 208/216 R |

FOREIGN PATENT DOCUMENTS

| | | |
|---|---|---|
| EP | 0 770 426 A1 | 5/1997 |
| JP | 52-68890 A | 6/1977 |
| JP | 63-502648 A | 10/1988 |
| JP | 7-23476 B2 | 3/1995 |
| JP | 9-173849 A | 7/1997 |
| JP | 9-263843 A | 10/1997 |

* cited by examiner

*Primary Examiner*—Steven Bos
(74) *Attorney, Agent, or Firm*—Birch, Stewart, Kolasch & Birch, LLP (57) ABSTRACT

A heavy oil is hydrorefined using a hydrorefining catalyst. A spent hydrorefining catalyst whose activity has decreased is heat treated (S1) and pulverized to obtained a regenerated powder (S2). This regenerated powder is fractionated according to its metal content (S3), formed (S6), dried (S7), and calcined (S7) to manufacture a regenerated catalyst whose volume of pores with a diameter of 50 to 2000 nm is at least 0.2 ml/g, and whose volume of pores with a diameter over 2000 nm is no more than 0.1 mL/g. Using this regenerated catalyst, a heavy oil containing at least 45 wt ppm vanadium and nickel as combined metal elements is hydrodemetalized, and the vanadium and nickel are recovered from the used regenerated catalyst (SS1). Through hydrorefining, the metal components are recovered more efficiently, and the spent catalyst can be reused to manufacture a regenerated catalyst that exhibits high reaction, activity.

10 Claims, 2 Drawing Sheets

METHOD FOR MANUFACTURING HYDROREFINING CATALYST, AND METAL RECOVERY METHOD

CROSS-REFERENCE

This application is a Continuation Application of International Application No. PCT/JP01/04802 which was filed on Jun. 7, 2001 claiming the conventional priority of Japanese patent Applications No. 2000-171427 filed on Jun. 8, 2000 and No. 2000-218139 filed on Jul. 19, 2000.

BACKGROUND OF THE INVENTION

1. Field of the Invention

This invention relates to a method for manufacturing a regenerated catalyst using a spent catalyst that has been used in the hydrorefining of a petroleum distillate and for reusing the regenerated catalyst. It also relates to a method with which the vanadium and other metals contained in a heavy oil are recovered by hydrorefining.

2. Description of the Related Art

A hydrorefining catalyst is generally manufactured by supporting molybdenum and other such hydrogenation active metal components on a porous carrier such as alumina. Hydrorefining reduces the amount of sulfur, nitrogen, metals such as vanadium, and so forth in a heavy oil. Hydrorefining involves bringing a hydrocarbon oil into contact with hydrogen in the presence of a catalyst, cracking the sulfur compounds and other such hetero compounds, and separating these out as hydrogen sulfide, ammonia, and the like.

When hydrorefining is continued for an extended period of time, coke and metals are deposited into the catalyst pores and lower the catalytic activity. This degradation is particularly pronounced when the hydrocarbon oil is a heavy oil. Accordingly, a used desulfurization catalyst whose catalytic activity has decreased is removed as a spent catalyst and replaced with a new catalyst. The removed spent catalyst can be disposed of as waste by burying it after any oils have been removed and, in some cases, after metals such as vanadium and molybdenum have been recovered. The remaining alumina from which the metals have been recovered is also sometimes utilized in applications other than as a catalyst, such as a raw material for aluminum sulfate.

A spent catalyst in which very little vanadium or other metals have been deposited is also sometimes reused as a catalyst after the removal of coke. It may also be reused after the metals have been taken out by dissolution.

Still, the activity of a catalyst obtained by a conventional recycling method is not as high as that of a new catalyst. Also, the mechanical strength is diminished by treatments such as calcination performed in order to remove the coke. This decrease in mechanical strength is a problem in that the catalyst breaks up into a powder when repacked into the reactor. Consequently, the reuse of such catalysts has been limited.

Hydrorefining can also be thought of as a treatment by which vanadium and other metals are recovered from a petroleum distillate by means of a catalyst, in which case the metal content in the catalyst that has been used in hydrorefining (spent catalyst) must be raised in order to recover the metals more efficiently. Hydrorefining catalysts have not been studied from this standpoint up to now.

The present invention was achieved in an effort to solve the problems encountered with the above conventional art, and a first object thereof is to provide a method for manufacturing a hydrorefining catalyst that exhibits high activity in a specific reaction by using a catalyst that has been used in hydrorefining. A second object of the present invention is to provide a method for recovering metals at a high efficiency through hydrorefining.

SUMMARY OF THE INVENTION

A first aspect of the present invention provides a method for manufacturing a catalyst using, as raw material, a hydrorefining catalyst which has been used in the hydrorefining of a heavy oil and which contains vanadium and nickel, comprising the steps of obtaining a catalyst powder by pulverizing the used hydrorefining catalyst, fractionating the catalyst powder based on the content at least one of vanadium or nickel, and forming the obtained catalyst powder. The activity of a hydrorefining catalyst is markedly degraded by metal build-up, and this metal build-up occurs more on the outer surface of the catalyst particles and less in the center. In view of this, a catalyst that has been used in hydrorefining (hereinafter referred to as a spent catalyst) can be pulverized and reformed into a regenerated catalyst. A regenerated catalyst with higher activity is obtained by using the portion at the center of the spent catalyst, which has undergone less activity degradation, as the outer surface of the regenerated catalyst.

In the manufacturing method of the present invention, the fractionation can be performed by sieving or magnetic separation. The manufacturing method of the present invention can further comprise the step of drying and calcining of the formed catalyst powder.

Furthermore, in the manufacturing method of the present invention, it is preferable if the catalyst powder is adjusted as a volume of pores of the catalyst with a diameter of 50 to 2000 nm, which are macropores that are effective for the diffusion of the metal compounds in the heavy oil into the catalyst interior, is large, such as 0.2 $cm^3/g$ or greater, for example, and the volume of pores with a diameter of 2000 nm or more, which are macropores that lower the mechanical strength, is small, such as 0.1 $cm^3/g$ or less. Accordingly, the regenerated catalyst has a large metal build-up capacity, its activity is decreased less by metal build-up, and the demetalization activity is particularly high. Therefore, a catalyst of relatively high activity can be manufactured from a spent catalyst, and since the catalyst is recycled, the final amount of waste material is reduced.

According to the present invention, a heavy oil containing vanadium and nickel can be hydrodemetalized using a hydrorefining catalyst that has been manufactured by the above-mentioned method for manufacturing the hydrorefining catalyst, and the vanadium or nickel or both can be recovered from the manufactured catalyst used in the hydrodemetalization. The vanadium or nickel or both can be recovered by oxidizing roasting.

A second aspect of the present invention provides a method for recovering metal from a hydrorefining catalyst that has been used in the hydrorefining of a heavy oil, comprising the steps of obtaining a catalyst powder by pulverizing the used hydrorefining catalyst; fractionating the obtained catalyst powder according to the amount of metal contained in the catalyst powder; and recovering the metal component from the fractionated catalyst powder. A high concentration of metal builds up on a spent catalyst used in hydrorefining, and particularly on the outer surface of the spent catalyst. This metal can be recovered from the catalyst on which the metal component is deposited at a high yield by pulverizing the catalyst and then fractionating out the catalyst powder with a high metal content. In actual practice, iron is deposited on the outermost surface of a spent catalyst. In view of this, if the spent catalyst is pulverized into a powder, and the portion of the powder containing a larger amount of iron (which interacts strongly with a magnetic field) is sorted out, this powder will at the same time contain large amounts of vanadium and nickel. Therefore, by subjecting a pulverized spent catalyst powder to magnetic separation and sorting out the powder containing iron, it is possible to obtain the portion of the spent catalyst containing more vanadium and nickel, which affords higher metal recovery efficiency.

A third aspect of the present invention provides a hydrorefining catalyst, comprising a carrier formed from an inorganic porous oxide; a hydrogenation active metal component supported on this carrier; and vanadium distributed uniformly throughout the catalyst, wherein the pore volume is at least 0.2 cm$^3$/g for pores with a diameter of 50 to 2000 nm, and the pore volume is no more than 0.1 cm$^3$/g for pores with a diameter over 2000 nm. A catalyst used in the hydrorefining of a heavy oil normally contains vanadium, and a regenerated catalyst regenerated by the manufacturing method of the present invention has vanadium uniformly dispersed throughout the catalyst. It is preferable that a ratio of vanadium content in an outer portion in the catalyst to vanadium content in an inner portion in the catalyst is from 0.8 to 1.2, particularly from 0.9 to 1.1. It is also preferable for the vanadium content to be 0.2 to 10 wt % with respect to the catalyst weight.

The hydrogenation active metal of the hydrorefining catalyst of the present invention can include at least one of molybdenum and tungsten, and at least one of nickel and cobalt. This allows a regenerated catalyst with excellent mechanical strength to be obtained.

DESCRIPTION OF THE PREFERRED
EMBODIMENTS OF THE INVENTION

Spent Catalyst

In this specification, the term "spent catalyst" refers to a hydrorefining catalyst that has been used in the hydrorefining of a heavy oil and whose activity has thereby been diminished. A spent catalyst is deemed to be one whose hydrorefining activity, such as its desulfurization activity, has dropped to the point that, if a reaction rate constant of a fresh catalyst at a specific temperature is assumed to be 100%, the reaction rate constant at this specific temperature is 80% or less, and particularly 50% or less. The reaction rate constants for the desulfurization and demetalization reactions are determined, provided that the desulfurization reaction can be expressed in a quadratic equation and the demetalization reaction can be expressed in a linear equation (linear expression).

It is also favorable to use a spent catalyst in which hydrorefining has been accompanied by the build-up of nickel and vanadium in a total metal weight of 1 to 30 wt %, and particularly 2 to 25 wt %, and especially 3 to 20 wt %.

It is particularly favorable if the catalyst used in hydrorefining has been used in hydrodesulfurization. This is because whereas a relatively large amount of metal builds up on the inside of a catalyst used in demetalization, with a catalyst used in desulfurization there is relatively little metal build-up in the interior, so the activity in the interior is relatively high. A catalyst in which hydrogenation active metal components are supported on a carrier whose principal component is alumina can be used to advantage as a hydrorefining catalyst.

The hydrorefining catalyst preferably contains alumina in an amount of at least 60%, and especially at least 75%, with respect to the catalyst weight. This alumina is preferably one obtained by calcining pseudo-boehmite at 450 to 850° C. (normally called γ-alumina). Besides alumina, this catalyst may also include silica-alumina, zeolite, boria, titania, zirconia, magnesia, phosphorous, or another compound oxide.

It is favorable for the hydrogenation active metal components supported on the hydrorefining catalyst to be Group 6, 8, 9, or 10 elements, and particularly one or more element selected from among molybdenum, tungsten, nickel, and cobalt. It is preferable for these elements to be contained in the catalyst in the form of a metal, oxide, or sulfide. It is preferable for these elements to be contained in the catalyst in an amount of 0.1 to 20 wt %, and particularly 1 to 15 wt %, and especially 5 to 12 wt %, as the total metal weight. A compound of phosphorous and/or boron (usually in the form of an oxide) can be supported on the catalyst or added to the catalyst in an amount of 0.1 to 20 wt %, and particularly 0.2 to 5 wt %, as the element weight, and this increases the catalyst activity.

Supporting, kneading, or another such method can be employed as the method for supporting the hydrogenation active metal components on the catalyst. Any commonly used impregnation method, such as pore filling, heating impregnation, vacuum impregnation, dipping, or another such known means can be used as the method for supporting the hydrogenation active metal components. After impregnation with the metal components, it is preferable to dry the catalyst for 10 minutes to 24 hours at a temperature of 80 to 200° C., and calcine it for 15 minutes to 10 hours at 400 to 600° C., and particularly 450 to 550° C. The kneading method may involve adding the hydrogenation active metal components to the raw material powder ahead of time, or mixing and kneading them along with the raw material powder.

As to the pore structure of the hydrorefining catalyst, it is preferable for the pore volume to be at least 0.4 cm$^3$/g, and particularly 0.5 to 1.1 cm$^3$/g, and especially 0.6 to 1.0 cm$^3$/g. The pore volume referred to here can be measured from the amount of nitrogen gas adsorbed (calculated as a liquid) at a relative pressure of 0.967 in a nitrogen gas removal process. The median pore diameter in a pore diameter distribution of 2 to 60 nm is preferably 6 to 30 nm (or 6 to 20 nm), and particularly 8 to 15 nm, and especially 8 to 12 nm, and the specific surface area is preferably 100 to 350 m$^2$/g, and particularly 150 to 250 m$^2$/g. The median pore diameter can be measured as the pore diameter at which the cumulative pore volume from the larger pore volume side is half the pore volume (V/2), from the relationship between pore diameter and pore volume calculated by the BJH method using as the pore volume (V) the volume measured from the amount of nitrogen gas adsorbed (calculated as a liquid) at a relative pressure of 0.967 in a nitrogen gas removal process. The pore size distribution at a pore diameter of approximately 2 to 60 nm can be measured by nitrogen adsorption method. The BJH method is disclosed in the Journal of the American Chemical Society, Vol. 73, p. 373 (1951). Mercury intrusion porosimetry method can be used for pore volumes that exceed the measurement range of the nitrogen adsorption method. Measurement by mercury intrusion porosimetry method was conducted at a mercury contact angle of 140° and a surface tension of 480 dyne/cm, within a pressure range of 2 to 4225 kg/cm$^2$ (30.4 to 60,000 psia).

Hydrorefining is a treatment in which a hydrocarbon oil is brought into contact with a hydrorefining catalyst along with hydrogen so as to reduce the amount of sulfur and other impurities contained in the oil. At least 50%, and particularly 70% or more, of the sulfur contained in a feed oil is usually removed by a hydrorefining treatment. Preferred reaction conditions include a reaction temperature of 300 to 450° C., a hydrogen partial pressure of 3 to 25 MPa, a liquid space velocity of 0.1 to 10 hr$^{-1}$, and a hydrogen/oil ratio (the ratio of hydrogen to hydrocarbon) of 100 to 4000 L/L. Even better is a reaction temperature of 320 to 430° C., a hydrogen partial pressure of 8 to 20 MPa, a liquid space velocity of 0.15 to 2.0 hr$^{-1}$, and a hydrogen/oil ratio of 300 to 1500 L/L. Examples of hydrorefining include hydrodesulfurization, hydrodenitrogenation, and hydrodemetalization.

The heavy oil that is the subject of hydrorefining has as its main component a fraction with a boiling point of at least 350° C., and preferably contains at least 30%, and particularly at least 50%, a fraction with a boiling point of at least 350° C. Examples of such heavy oils include various heavy fractions and residual oils obtained by the atmospheric distillation or vacuum distillation of crude oil, tar sand, shale oil, coal liquefaction oil, or the like, as well as these heavy oils that have undergone a treatment such as cracking, isomerization, reformation, or solvent extraction.

Regenerated Powder

With the present invention, a catalyst powder (hereinafter also referred to as a regenerated powder) is obtained by pulverizing a spent catalyst. The spent catalyst can be pulverized by using a known apparatus such as a ball mill, roller mill, jet mill, or pulverizer. This pulverization is performed such that the regenerated powder obtained by the pulverization of the spent catalyst will have an average particle diameter of 800 µm or less, and preferably 50 to 600 µm, and even more preferably 100 to 500 µm. "Average particle diameter" as used here is the median diameter measured by a standard wet laser light scattering method.

The regenerated powder is fractionated according to its metal content, and particularly its vanadium and nickel content. A regenerated catalyst (discussed below) is manufactured using regenerated powder that has a lower content of vanadium and nickel than before fractionation. The metal is preferably recovered from regenerated powder that has a higher content of vanadium and nickel than before fractionation. Fractionation according to the metal content can be performed using the specific gravity of the regenerated powder, its interaction with magnetic force, its shape or color, its interaction with solvents, and so forth. Specific examples of fractionation methods include floatation sorting, shape sorting, color sorting, fluid classification, thin flow sorting, magnetic separation, and vibratory sieving.

It is particularly favorable to employ fractionation by particle diameter, and more specifically, fractionation with a sieve having a mesh size of 100 to 400 µm, or fractionation by magnetic force, and more specifically, fractionation by magnetic flux density of 2000 to 50,000 gauss, and particularly 5000 to 20,000 gauss. The magnetic separation apparatus can be a high-slope magnetic separator, a drum-type magnetic separator, or the like. When magnetic separation is performed, it is preferable for the regenerated powder to contain iron in an amount of 0.3 to 10 wt %, and particularly 0.5 to 5 wt %. This is because if iron is contained in the heavy oil being subjected to hydrorefining, it will build up over the course of the hydrorefining, and if it is not contained in the heavy oil, a treatment should be performed to build up the iron, such as the hydrorefining of a heavy oil containing iron. Magnetic separation will be easier if the iron is present in the form of an oxide (ferrite), so it is preferable to perform a heat treatment in an oxidative atmosphere prior to the magnetic separation step.

A combination of the above separation methods may also be employed. This fractionation yields a regenerated powder with a relatively low metal content.

A pretreatment can also be performed to remove hydrocarbons, coke, metals, or the like contained in the spent catalyst either before or after the pulverization of the spent catalyst. In particular, to remove hydrocarbons and coke, it is preferable to perform a heat treatment in an inert atmosphere such as nitrogen, and then perform a heat treatment in an oxidative atmosphere such as air or in a mixed gas of air and a combustion gas. This heat treatment should be performed for 1 to 12 hours (or 1 to 24 hours), and particularly 2 to 6 hours (or 2 to 12 hours), at a temperature of 300 to 600° C. (or 250 to 600° C.), and particularly 350 to 550° C. (or 300 to 550° C.).

Metal Recovery

Vanadium and nickel can be recovered from a regenerated powder with a relatively high metal content. This recovery can be performed by oxidizing roasting, autoclaving, soda roasting, complete dissolution, or another such method. The metal content of the separated spent catalyst powder is 1.2 to 5 times, and particularly 1.5 to 3 times, the metal content of the original spent catalyst, so the metal can be recovered more efficiently.

Manufacturing the Regenerated Catalyst

A regenerated catalyst is manufactured by forming the above-mentioned regenerated powder. For the purposes of this forming, the average particle diameter of the regenerated powder should be 300 µm or less, and particularly 200 µm or less, with 1 to 150 µm being especially good, and 5 to 100 µm even better. If the average particle diameter of the regenerated powder is above this preferable range, the powder is pulverized as needed using a known apparatus such as a ball mill, roller mill, jet mill, or pulverizer.

The regenerated powder is preferably a powder whose pore volume is at least 0.4 cm$^3$/g and whose average particle diameter is at least 1 µm. If the pore volume of the regenerated powder is less than 0.3 cm$^3$/g, or preferably 0.4 cm$^3$/g, the volume of pores with a diameter of 50 nm or less in the regenerated catalyst will be low, so the amount of metal build-up will be small. If the average particle diameter is less than 1 µm, the volume of pores with a diameter of 50 to 2000 nm in the regenerated catalyst will be low, so demetalization activity will decrease. If the average particle diameter is over 300 µm, the volume of pores with a diameter of over 2000 nm in the regenerated catalyst will be high, so the mechanical strength of the regenerated catalyst will decrease.

There are no particular restrictions on the method for forming the regenerated powder, but an example is to add water, an organic solvent, or the like to the regenerated powder to produce a mixture in the form of a paste or clay. This forming can be performed by extrusion forming, press forming, coating of a worked sheet, or the like. A regenerated catalyst can be obtained by drying and, if needed, calcination after the forming. A regenerated powder in the form of a gel or slurry can be formed into beads by being dispersed and dried in a dry gas (such as spray drying). Further, a regenerated powder in the form of a gel or slurry also can be formed into beads in a liquid. Forming methods in which the regenerated powder is formed directly include a method in which a forming auxiliary is added as needed to the regenerated powder and press forming is performed in a tablet-making machine, and a method in which the forming involves rolling granulation.

The mixing of the regenerated powder and liquid during forming can be accomplished with any mixer, kneader, or the like commonly used in catalyst preparation. One favorable method involves adding water to the above-mentioned regenerated powder and then mixing with agitator blades. Normally, water is added as the liquid here, but this liquid may instead be an alcohol, a ketone, or another organic compound. Nitric acid, acetic acid, formic acid, and other such acids, ammonia and other such bases, organic compounds, surfactants, active components, and so forth may also be added and mixed, and it is particularly favorable to add a forming auxiliary composed of an organic compound such as water-soluble cellulose ether in an amount of 0.1 to 7 wt %, and particularly 0.2 to 5 wt %, and especially 0.5 to 3 wt %, with respect to the regenerated powder. As to other materials besides the regenerated powder, pseudo-boehmite powder and other hydrous alumina powders or the like can also be added in order to increase strength, but it is preferable for the regenerated powder to be the main component, and for the proportion of the regenerated catalyst weight accounted for by the regenerated powder to be at least 70 wt %, and particularly at least 80 wt %, and especially at least 95 wt %.

The material can be easily formed into pellets, a honeycomb shape, or another shape by using a plunger-type extruder, a screw-type extruder, or another such apparatus. The material is usually formed into beads or hollow or solid cylinders with a diameter of 0.5 to 6 mm, or into a shape such as columns with a trilobe or quadrilobe cross section. After forming, the product is dried between normal temperature and 150° C., and preferably between 100 and 140° C., after which it is calcined for at least 0.5 hour at 350 to 900° C. (or 350 to 700° C.), and preferably for 0.5 to 5 hours at 400 to 850° C. (or 400 to 650° C.).

Because the hydrogenation active metal components supported by the spent catalyst end up being contained in this regenerated catalyst, adequate catalyst activity will be exhibited even without hydrogenation active metal being supported during the manufacture of the regenerated catalyst. If needed, hydrogenation active metal components and phosphorus and/or boron can also be supported. The metal components and support method in this case are the same as with a hydrorefining catalyst.

As to the pore state of the regenerated catalyst thus obtained, it is preferable for the pore volume to be at least 0.15 cm$^3$/g, and particularly 0.20 cm$^3$/g, for pores with a diameter of 50 to 2000 nm; for the pore volume to be at least 0.10 cm$^3$/g, and particularly at least 0.15 cm$^3$/g, for pores with a diameter of 50 to 1000 nm; and for the pore volume to be at least 0.1 cm$^3$/g, and particularly 0.05 cm$^3$/g, for pores with a diameter of 2000 nm or more. These pore volumes for pores with a diameter of 50 nm or more can be measured by mercury intrusion porosimetry method at a mercury contact angle of 1400 and a surface tension of 480 dyn/cm within a pressure range of 2 to 4225 kg/cm$^2$. The median pore diameter in a pore diameter distribution of 2 to 60 nm is preferably 6 to 20 nm, and particularly 8 to 15 nm, and especially 8 to 10 nm, and the specific surface area is preferably 100 to 350 m$^2$/g, and particularly 150 to 200 m$^2$/g. The median pore diameter can be measured by nitrogen adsorption method, and the pore volume for pores with a diameter of 50 nm or less can be measured from the amount of nitrogen gas adsorbed (calculated as a liquid) at a relative pressure of 0.967 in a nitrogen gas removal process, using the nitrogen adsorption method. The total pore volume, which is the sum of the pore volume for pores with a diameter of 50 nm or less and the pore volume for pores with a diameter of 50 nm or more, is preferably at least 0.5 cm$^3$/g, and particularly at least 0.6 to 1.1 cm$^3$/g.

The regenerated catalyst preferably contains molybdenum and/or tungsten, and nickel and/or cobalt. Since vanadium remains in the regenerated powder, this vanadium ends up being contained in the regenerated catalyst as well. The molybdenum and/or tungsten content is 1 to 20 wt %, and preferably 2 to 10 wt %, the nickel and/or cobalt content is 0.5 to 10 wt %, and preferably 1 to 5 wt %, and the vanadium content is 0.2 to 10 wt %, and preferably 0.5 to 5 wt %.

The distribution of metal components within the catalyst particles is substantially uniform in this catalyst. More specifically, the fact that the distribution of metal components is substantially uniform can be confirmed by the following method. In a cross section of the catalyst particles (pellets), a plurality of measurement points are determined on a straight line from the outer surface of the catalyst to the center of the catalyst, and the metal component concentration is measured at each of these measurement points (line analysis). When a distance from the outer surface to the center of the catalyst is R, a region between the center of the catalyst and points which lies R/2 away from the center is called herein as "an inner portion" of the catalyst while a region between the points and the outer surface is called herein as an "outer portion" of the catalyst. Whether or not the distribution of metal components is uniform can be ascertained from a ratio of an average value of the metal component concentration (content) at the measuring points in the outer portion and an average value of the metal component concentration at the measuring points in the inner portion. If this value is 1, then the distribution of the metal components can be considered to be completely uniform. In the present invention, it is preferable for the value to be 0.8 to 1.2, and particularly from 0.9 to 1.1, and if it is, the distribution of metal components in the catalyst particles can be considered to be substantially uniform.

The phrase "center of the catalyst" as used in this specification refers to a point or a collection of points included in the catalyst and farthest away from the outer surface of the catalyst. When the catalyst approximates a shape of rotational symmetry, the phrase "center of the catalyst" refers to a point or a collection of points included in the catalyst and farthest away from the outer surface of the catalyst in a cross section perpendicular to the axis of symmetry. For example, when the catalyst particles are spherical, the center of the catalyst indicates the center of the sphere. When the catalyst is in the form of cylinders, the center of the catalyst means a collection of points that lies along the rotation axis of the cylinder and is farthest away from the outer surface. When the catalyst is in the tubular form, the center of the catalyst means a collection of points that lies along the center axis of the tube and is farthest away from the outer surface. If the catalyst is in a trilobe or quadrilobe configuration, the point farthest away from the outer surface will vary with the extent of overlap in the three or four lobes. Specifically, if there is little overlap in the three or four lobes, the point farthest away from the outer surface will be the center position of each of the lobes, but if there is much overlap in the three or four lobes, the point farthest away from the outer surface will be located on the rotational axis of the trilobe or quadrilobe catalyst. When the catalyst has a shape having an odd number of lobes such as trilobe and the center of the catalyst is located on the rotational axis, there may be a case that a length of one straight line from one point on the outer surface of the catalyst to the center of the catalyst is different from a length of the other straight line from the other point, which is opposed to the one point with respect to the center point, on the outer surface of the catalyst to the center of the catalyst. In such a case, the inner portion and the outer portion are defined on the basis of the different lengths between the one straight line and the other straight line.

Any analytical method suited to the quantitative analysis of elements included in a microregion can be used for the line analysis of the metal component concentration discussed above. For example, EPMA, Auger electron spectroscopy, or secondary ion mass spectrometry (SIMS) can be used. If the catalyst particles (pellets) have no hollow portions and approximate a shape of rotational symmetry, then the cross section to be analyzed is one that is perpendicular to this axis of symmetry, with the axis of symmetry becoming the center of the cross section.

Hydrodemetalization

The above-mentioned regenerated catalyst can be used to advantage as a catalyst in the hydrorefining, and particularly the hydrodemetalization, of heavy oils. Hydrodemetalization is a treatment in which a heavy oil containing vanadium and nickel in a combined amount of at least 45 ppm (as metal elements) is brought into contact with a catalyst along with hydrogen so that the metal content in the heavy oil is reduced. The allowable amount of metal build-up in the regenerated catalyst is 30 wt % or more, and particularly 50 to 150 wt %. The allowable amount of metal build-up is the amount of build-up of vanadium and nickel at the point when metal components have built up in the catalyst through hydrorefining and the activity has dropped so low that the vanadium and nickel demetalization rate is 50%, and is defined as the weight of vanadium and nickel metal elements built up versus the initial catalyst weight.

Favorable reaction conditions for hydrodemetalization include a reaction temperature of 300 to 450° C., a hydrogen partial pressure of 3 to 25 MPa, a liquid space velocity of 0.1 to 10 hr$^{-1}$, and a hydrogen/oil ratio of 100 to 4000 L/L, and preferably a reaction temperature of 320 to 430° C., a hydrogen partial pressure of 8 to 25 MPa, a liquid space velocity of 0.15 to 2.0 hr$^{-1}$, and a hydrogen/oil ratio of 300 to 1500 L/L. A fixed bed catalyst layer is usually preferable for the reactor, but a mobile bed or the like can also be used. Hydrodenitrogenation and hydrodesulfurization may also proceed concomitantly during the hydrodemetalization. The heavy oil that is subjected to hydrodemetalization is a hydrocarbon oil whose main component is a fraction with a boiling point of at least 350° C., and preferably the fraction with a boiling point of at least 350° C. is contained in an amount of at least 50%, and particularly at least 70%. It is also possible to perform hydrodemetalization on a heavy oil containing 100 ppm or more, or even 300 ppm or more, vanadium and nickel (as the combined amount of metal elements).

Recovery of Metal

Vanadium and nickel are recovered from a demetalized spent catalyst that has undergone the above-mentioned demetalization treatment to build up the vanadium and nickel to at least 20 wt %, and preferably at least 30 wt %, as the combined metal weight with respect to the weight of the regenerated catalyst at the start of the demetalization reaction. This recovery can be performed by oxidizing roasting, autoclaving, soda roasting, complete dissolution, or another such method.

EXAMPLES

The present invention will now be described through examples, but the present invention should not be construed as being limited by these examples.

Desulfurization Catalyst

Pseudo-boehmite powder was kneaded and formed into the form of cylinders (1/12 inch) and quadrilobe columns (1/22 inch). These were each calcined for 1 hour at 600° C. to produce γ-alumina carriers, which were impregnated in an ammonium molybdate aqueous solution and a nickel nitrate aqueous solution, respectively, and then dried for 20 hours at 130° C., after which these products were calcined for 0.5 hour at 450° C. to obtain two types of desulfurization catalyst of different shapes. Table 1 lists the composition and properties of the resulting desulfurization catalyst comprising 1/12-inch cylinders (hereinafter referred to as the cylindrical desulfurization catalyst) and the desulfurization catalyst comprising 1/22-inch quadrilobe columns (hereinafter referred to as the quadrilobe desulfurization catalyst). The specific surface area referred to here was measured by BET method using the adsorption of nitrogen, and the pore volume was measured from the amount of nitrogen gas adsorbed (calculated as a liquid) at a relative pressure of 0.967 in a nitrogen gas removal process. This pore volume corresponds to the volume of pores with a diameter of 50 nm or less.

TABLE 1

|  |  | Cylindrical desulfurization catalyst | Quadrilobe desulfurization catalyst |
|---|---|---|---|
| Fresh catalyst prior to operation | Molybdenum (metal t %) | 8.0 | 8.2 |
|  | Nickel (metal wt %) | 2.2 | 2.3 |
|  | Alumina (wt %) | 85 | 85 |
|  | Specific surface area (m$^2$/g) | 232 | 231 |
|  | Pore volume (cm$^3$/g) | 0.61 | 0.60 |
|  | Median pore diameter (nm) | 9.1 | 8.9 |
| Amount of build-up on spent catalyst | Nickel (metal wt %) | 4.5 | 2.9 |
|  | Vanadium (metal wt %) | 10.4 | 7.5 |
|  | Iron (metal wt %) | 1.9 | 2.1 |

Hydrodesulfurization

The above desulfurization catalyst was packed into the reactor of a heavy oil desulfurization apparatus installed at the Mizushima Refinery of Japan Energy Corporation. The reaction column of the heavy oil desulfurization apparatus was divided into an upstream catalyst layer (36 vol %) and a downstream catalyst layer (64 vol %), and the above-mentioned two types of desulfurization catalyst were packed into the downstream catalyst layer. After packing, the apparatus was operated for 397 days using a feed oil with the average properties shown in Table 2, under the reaction conditions shown in Table 3. Table 4 shows the conversion rate at the start of run, the average throughout the operation period, and the end of run.

TABLE 2

| Feed oil | Vacuum distillation residue from Middle-Eastern crude oil |
|---|---|
| 10% distillate temperature (° C.) | 490 |
| 30% distillate temperature (° C.) | 554 |
| 50% distillate temperature (° C.) | 629 |
| Specific gravity | 1.045 |
| Sulfur (wt %) | 5.13 |
| Vanadium (wt ppm) | 110 |
| Nickel (wt ppm) | 38 |
| Iron (wt ppm) | 11 |

TABLE 3

| | |
|---|---|
| Average reaction pressure (MPa) | 13.8 |
| Average hydrogen/oil ratio (L/L) | 1050 |
| Average reaction temperature (° C.) | 379 |
| Average liquid space velocity in upstream catalyst layer (hr$^{-1}$) | 0.36 |
| Average liquid space velocity in downstream catalyst layer (hr$^{-1}$) | 0.20 |

TABLE 4

| | At start of run | Average | At the end of run |
|---|---|---|---|
| Desulfurization rate (%) | 87 | 83 | 73 |
| Vanadium removal rate (%) | 79 | 76 | 66 |
| Nickel removal rate (%) | 65 | 63 | 52 |
| Reaction temperature (° C.) | 366 | 379 | 400 |

The desulfurization catalyst was recovered as spent catalyst upon completion of the above operation, Soxhlet extraction was performed, and this was followed by elemental analysis to measure the amount of metal build-up. These results are shown in Table 1. The amounts of build-up of the various metals were determined while assuming that the fresh catalyst prior to operation consisted of $Al_2O_3$, $MoO_3$, and NiO, the total weight of these compounds was the weight of the fresh catalyst, and the ratio between aluminum, molybdenum, and nickel contained in the fresh catalyst was preserved in the spent catalyst. The fresh catalyst weight with respect to the spent catalyst was determined from the ratio of $Al_2O_3$, $MoO_3$, and NiO in the fresh catalyst and the results of analysis of the elemental aluminum weight in the spent catalyst. Since nickel was also contained in the fresh catalyst, the remainder of subtracting the weight of elemental nickel contained in the fresh catalyst from the weight contained in spent catalyst was termed the nickel build-up amount.

Figure 1:
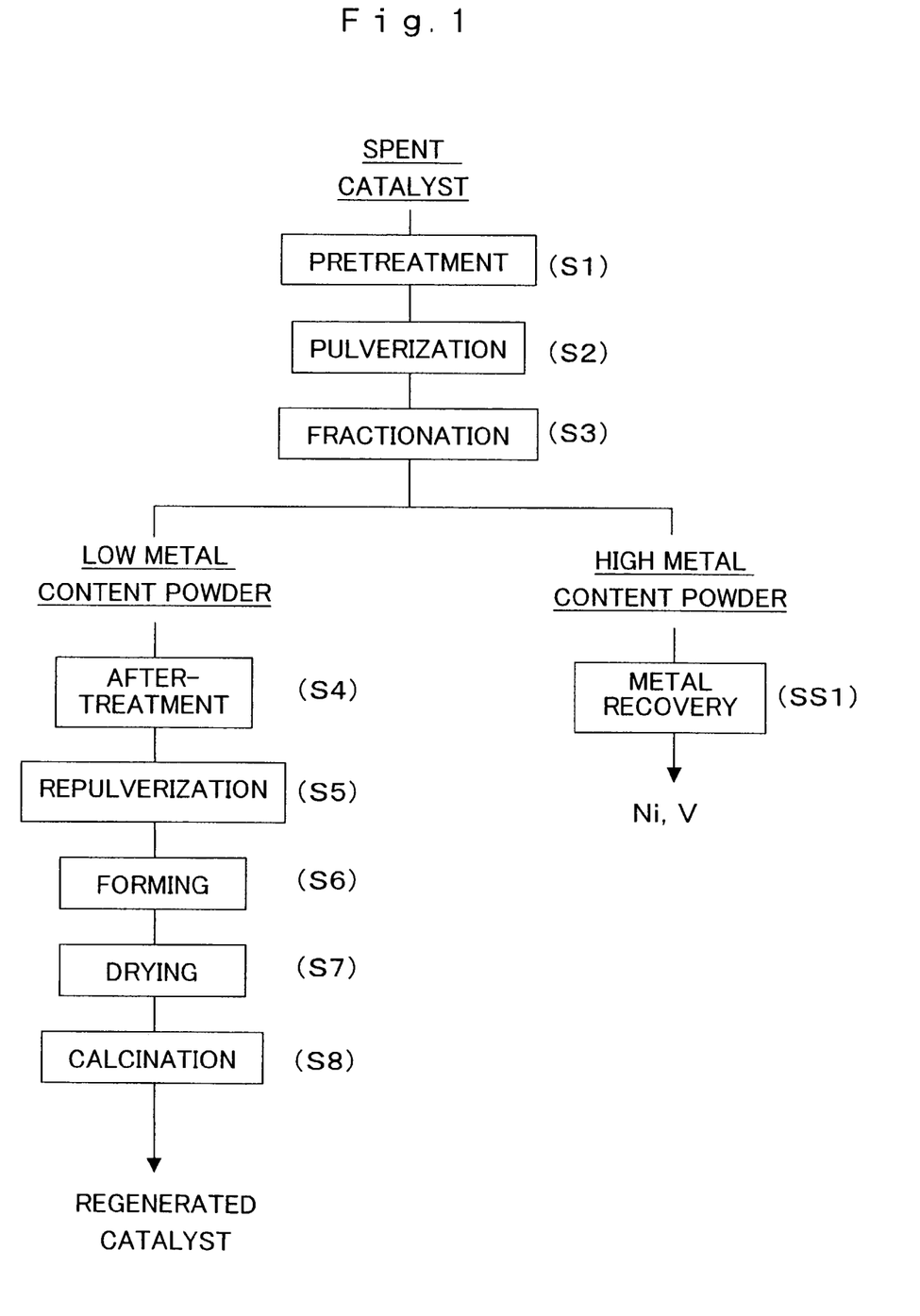
FIG. 1 is a flow chart of a specific example of the method for manufacturing a hydrorefining catalyst according to the present invention.

The process of regenerating the resulting spent catalyst will now be described through reference to the flow chart in FIG. 1.

Calcination of Spent Catalyst (S1)

The recovered spent catalyst was heat treated in an atmosphere furnace for 2-3 hours at 350° C. under a nitrogen gas flow to remove the oil component. After this, calcination was performed for 5-15 hours at 500° C. under an air flow to remove part of the coke near the surface of the spent catalyst and to partially oxidize the metal sulfides. Calcination has to be continued for at least 20 hours in order to completely remove the coke or to completely oxidize the metal sulfides.

Pulverization of Spent Catalyst (S2)

As shown in Table 5, the calcined spent catalyst was continuously pulverized at 3000 rpm in a cutter mill (model MF10 Basic S1 by Ika Japan Co. Ltd.) in experiment numbers F20, F21, F22, F24, F28, and F32. Here, the aperture of the discharge outlet of the cutter mill was adjusted so that the pulverized spent catalyst would be obtained with an average particle diameter of 200 to 450 μm. The average particle diameter in this example was measured in wet manner, using a MicroTrac particle size distribution analyzer made by Nikkiso. In this wet manner, the sample is dispersed in water and irradiated with laser light, and particle size analysis is conducted by means of the forward-scattered light.

Sieving Separation (S3)

In experiment number F19, the calcined spent catalyst was not pulverized, but was separated with a sieve having a mesh size of 500 μm into plus sieve used as the regenerated catalyst sample and minus sieve used as the metal recovery sample. In experiment number F24, spent catalyst, which had been pulverized by a cutter mill, was separated with a sieve having a mesh size of 300 μm into plus sieve used as the regenerated catalyst sample and minus sieve used as the metal recovery sample. It is believed that, since the metal content attached or deposited on the outer surface of the spent catalyst is easy to pulverize, particles having higher content of metal components are collected, passing through the sieve.

Magnetic Separation

In experiment numbers F20, F21, F20, F28, and F32, a rod magnet with a surface flux density of 10,000 G made by Nippon Magnetics Inc. was used to separate the pulverized spent catalyst into magnetic and non-magnetic portions. The magnetic portion was used as the metal recovery sample, and the non-magnetic portion was used as the regenerated catalyst sample.

TABLE 5

| | Catalyst | | | | | | |
|---|---|---|---|---|---|---|---|
| | Cylindrical desulfurization catalyst | | | | Quadrilobe desulfurization catalyst | | |
| | Experiment No. | | | | | | |
| | F20 | F21 | F24 | F28 | F19 | F22 | F32 |
| Pulverization | C/M* | C/M* | C/M* | C/M* | None | C/M* | C/M* |
| Separation method | M/F** | M/F** | sieve | M/F** | sieve | M/F** | M/F** |

*Cutter mill
**Magnetic force

Re-Calcination (S4)

The metal recovery sample and the regenerated catalyst sample from which the pulverized spent catalyst had been separated were put back in the atmosphere furnace and calcined for 5-10 hours at 500° C. under an air flow to remove the coke and oxidize the metal sulfides. As shown in Tables 6 and 7, after this second calcination the metal recovery sample contained more vanadium and iron than the regenerated catalyst sample, while the regenerated catalyst sample had a larger specific surface area and pore volume and contained more molybdenum than the metal recovery sample. It can be seen that the regenerated catalyst sample in experiment number F19, which was not pulverized, had a higher content of vanadium and so forth than the other samples, and had a smaller specific surface area and pore volume.

TABLE 6

Regenerated catalyst sample

| | Cylindrical desulfurization catalyst | | | | Quadrilobe desulfurization catalyst | | |
|---|---|---|---|---|---|---|---|
| | Experiment No. | | | | | | |
| | F20 | F21 | F24 | F28 | F19 | F22 | F32 |
| Separation rate (wt %) | 61 | 63 | 67 | 61 | 67 | 59 | 76 |
| Vanadium (wt %) | 3.9 | 4.2 | 5.1 | 4.8 | 6.7 | 5.2 | 4.8 |
| Nickel (wt %) | 3.3 | 3.5 | 3.6 | 3.6 | 4.1 | 4.2 | 4.0 |
| Molybdenum (wt %) | 7.2 | 6.3 | 6.3 | 6.8 | 5.8 | 6.0 | 6.5 |
| Iron (wt %) | 0.3 | 0.3 | 1.4 | 0.3 | 0.8 | 0.3 | 0.2 |
| Specific surface area (m$^2$/g) | 176 | 174 | 153 | 165 | 120 | 151 | 159 |
| Pore volume (cm$^3$/g) | 0.53 | 0.51 | 0.45 | 0.49 | 0.37 | 0.45 | 0.46 |
| Median pore diameter (nm) | 9.9 | 9.5 | 9.8 | 9.8 | 10.0 | 9.9 | 9.7 |

TABLE 7

Metal recovery sample

| | Cylindrical desulfurization catalyst | | | | Quadrilobe desulfurization catalyst | | |
|---|---|---|---|---|---|---|---|
| | Experiment No. | | | | | | |
| | F20 | F21 | F24 | F28 | F19 | F22 | F32 |
| Separation rate (wt %) | 39 | 37 | 33 | 39 | 33 | 41 | 24 |
| Vanadium (wt %) | 7.7 | 7.7 | 6.8 | 6.9 | 7.5 | 8.1 | 7.5 |
| Nickel (wt %) | 3.4 | 3.9 | 3.6 | 3.5 | 3.9 | 4.4 | 4.3 |
| Molybdenum (wt %) | 4.6 | 5.1 | 5.1 | 4.9 | 5.0 | 5.2 | 5.7 |
| Iron (wt %) | 6.0 | 5.7 | 6.1 | 7.3 | 3.0 | 2.3 | 1.8 |
| Specific surface area (m$^2$/g) | 99 | 101 | 112 | 93 | 80 | 102 | 105 |
| Pore volume (cm$^3$/g) | 0.29 | 0.30 | 0.34 | 0.28 | 0.25 | 0.31 | 0.31 |
| Median pore diameter (nm) | 9.5 | 9.5 | 9.7 | 9.9 | 10.3 | 9.8 | 9.9 |

Preparation of Regenerated Catalyst (S5-S8)

Using a ball mill, regenerated catalyst sample F28 was pulverized to an average particle diameter of 15 μm (S5), water was added to and mixed with 650 g of this pulverized catalyst and 19 g of water-soluble cellulose ether, and this mixture was formed into ½₀-inch quadrilobe columns (four lobes in axial symmetry and having minor and major axes perpendicular to each other) (S6). This product was dried for 15 hours at 130° C. (S7) and then calcined for 1 hour at 500° C. under an air flow (S8), which yielded a regenerated catalyst. The pore volume of this regenerated catalyst was measured by mercury intrusion porosimetry method, which revealed that the volume of pores with a diameter of 50 to 1000 nm was 0.16 cm$^3$/g, the volume of pores with a diameter of 50 to 2000 nm was 0.21 cm$^3$/g, and the volume of pores with a diameter over 2000 nm was 0.01 cm$^3$/g. The pore structure of this regenerated catalyst was measured by nitrogen adsorption method, which revealed that the specific surface area was 163 m$^2$/g, the volume of pores under 50 nm was 0.45 cm$^3$/g, and the median pore diameter was 9.6 nm. Since the water-soluble cellulose ether was removed by oxidation in the calcination step, the regenerated catalyst substantially consisted of just the regenerated catalyst sample. The average particle diameter is the median diameter as measured by wet laser light scattering.

Distribution of Metal Components in Regenerated Catalyst

The distribution of metal component concentrations in the regenerated catalyst was determined by the line analysis discussed above. This line analysis was conducted using EPMA at an acceleration voltage of 20 kV, a probe current of 0.1 µA, a beam diameter of 50 µm, a step width of 50 µm, and a measurement duration of 1000 msec/point. The samples consisted of three pellets (sample Nos. 1 to 3) of the quadrilobe regenerated catalyst obtained as above (the catalyst obtained from F28). Each of three samples was embedded in epoxy resin, and was polished to generate a cross sectional plane perpendicular to the rotational axis. Then, the plane was surface processed by vapor-depositing carbon on the plane. The beam was scanned over a straight line which has the longest distance between the center of the catalyst on the rotational axis and a point on the outer surface of the four lobes of each sample. These results are given in Table 8. As shown in Table 8, in each of the samples, a ratio of an average concentration of the metal component in the measuring points in the inner portion of the catalyst to that in the measuring points in the outer portion is in the range of 0.9 to 1.1. This tells us that the molybdenum, nickel, and vanadium were uniformly distributed throughout the regenerated catalyst.

TABLE 8

| Sample | Metal Component | Average Concentration of Outer Portion (count) | Average Concentration of Inner Portion (count) | Outer Portion/ Inner Portion |
|---|---|---|---|---|
| No. 1 | Mo | 1737 | 1611 | 1.08 |
|  | Ni | 3845 | 3605 | 1.07 |
|  | V | 4691 | 5205 | 0.90 |
| No. 2 | Mo | 1661 | 1756 | 0.95 |
|  | Ni | 4117 | 4054 | 1.02 |
|  | V | 4737 | 4768 | 0.99 |
| No. 3 | Mo | 1556 | 1439 | 1.08 |
|  | Ni | 3329 | 3104 | 1.07 |
|  | V | 4156 | 4449 | 0.93 |

Hydrodemetalization

The regenerated catalyst was packed in an amount of 100 cm$^3$ in a fixed bed reactor (inside diameter: 25 mm, length: 1000 mm), and a hydrodemetalization reaction was conducted for 480 hours using the Boscan crude oil shown in Table 9 and under the hydrotreating conditions given in Table 10. At the start of the reaction the vanadium removal rate was 76% and the nickel removal rate was 64%, and at the end of the reaction the vanadium removal rate was 61% and the nickel removal rate was 52%, confirming that the regenerated catalyst had high demetalization activity. Upon completion of the reaction, the regenerated catalyst was recovered as a spent catalyst, Soxhlet extraction was performed, and this was followed by elemental analysis, which revealed that there had been a build-up of 40.3 wt % vanadium and 3.3 wt % nickel, as the metal element weight with respect to the weight of the regenerated catalyst. For the amounts of build-up of the metals, the remainder of subtracting the weight of each metal contained in the regenerated catalyst prior to operation from the weight of each metal present in the spent catalyst after the reaction was indicated as a proportion with respect to the regenerated catalyst prior to operation. The metal build-up volume of the regenerated catalyst was 75 wt %.

TABLE 9

| Feed oil | Boscan crude oil |
|---|---|
| 10% distillate temperature (° C.) | 314 |
| 30% distillate temperature (° C.) | 476 |
| 50% distillate temperature (° C.) | 576 |
| Specific gravity | 0.998 |
| Sulfur (wt %) | 4.62 |
| Vanadium (wt ppm) | 1197 |
| Nickel (wt ppm) | 116 |

TABLE 10

| Reaction pressure (MPa) | 14.0 |
|---|---|
| Hydrogen/oil ratio (L/L) | 670 |
| Reaction temperature (° C.) | 390 |
| Liquid space velocity in upstream catalyst layer (hr$^{-1}$) | 1.0 |

Recovery of Metals

Upon completion of the reaction, the regenerated catalyst was heat treated in an atmosphere furnace for 1 hour at 350° C. under a nitrogen gas flow to remove the oil component, and then roasting for 4 hours at 450° C. in an air flow, which oxidized the metal sulfides and removed the coke. Ion exchange water was added to the roasted catalyst, and this was heated to 80° C., after which sulfuric acid was added to bring the pH to 1, sodium sulfite was added in an amount of 0.8 equivalent with respect to the vanadium, and the system was stirred for 90 minutes, after which it was filtered to extract the vanadium, nickel, and molybdenum. The sediment remaining after extraction was primarily alumina, and after drying, it was disposed of as a non-combustible. Metal recovery can also be performed by the same procedure for the regenerated powder used for metal recovery (SS1).

Figure 2:
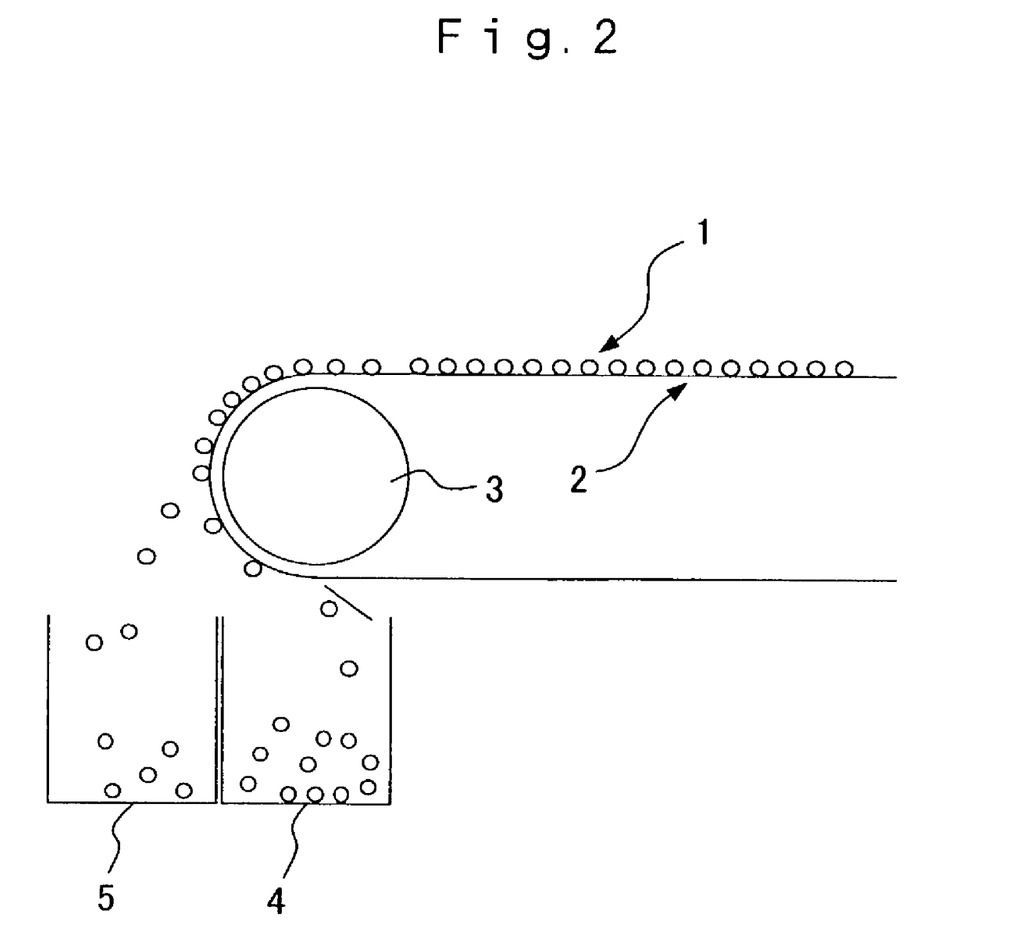
FIG. 2 is a schematic of the apparatus used in the magnetic separation in the method for manufacturing a hydrorefining catalyst according to the present invention.

With experiment numbers F20, F21, F22, F28, and F32 in this example, a rod magnet was used to separate the pulverized spent catalyst into magnetic and non-magnetic portions, but this separation can also be accomplished with the pulley-type magnetic separation shown in FIG. 2 (a high magnetic force, pulley-type, stainless steel separator made by Nippon Magnetics Inc.). As shown in FIG. 2, the spent catalyst powder 1 is continuously supplied onto a horizontally rotating belt 2, and conveyed by the rotation of the belt to a pulley 3 provided at one end. The pulley 3 is made of a rare earth magnet, and applies a magnetic field of 12,000 gauss to the belt 2. Accordingly, when the belt 2 moves under the pulley 3, the spent catalyst powder containing a large quantity of iron is drawn toward the surface of the belt, whereas the spent catalyst powder containing little iron falls off the belt 2. As a result, the place where the powder falls is divided into a high-metal zone 4 and a low-metal zone 5, allowing the magnetic separation to be accomplished by means of the zones in which the powder falls.

With the catalyst manufacturing method of the present invention, a catalyst with high catalytic activity and with adequate mechanical strength can be manufactured from a catalyst that has been used in the hydrorefining of a heavy oil. This is extremely effective in terms of recycling natural resources. Also, the use of the metal recovery method of the present invention allows valuable metals such as vanadium to be recovered from a used catalyst inexpensively and at a high yield.

What is claimed is:

1. A method for manufacturing a catalyst using, as raw material, a hydrorefining catalyst which has been used in the hydrorefining of heavy oils and which contains vanadium and nickel, comprising the steps of:
    obtaining a catalyst powder by pulverizing the used hydrorefining catalyst so as to obtain an average particle diameter of 200 to 450 μm;
    fractionating the catalyst powder based on the content of vanadium and nickel to obtain a catalyst powder fraction of reduced vanadium and nickel content and a catalyst powder fraction of higher vanadium and nickel content than before said fractionating; and
    forming a catalyst from said fraction of catalyst powder of reduced vanadium and nickel content.

2. The method for manufacturing the catalyst according to claim 1, wherein the fractionating is performed by sieving or magnetic separation.

3. The method for manufacturing the catalyst according to claim 1, further comprising a step of drying and calcining the formed catalyst.

4. The method for manufacturing the catalyst according to claim 1, wherein the manufactured catalyst has a pore volume of at least 0.2 cm$^3$/g for pores with a diameter of 50 to 2000 nm, and a pore volume of no more than 0.1 cm$^3$/g for pores with a diameter of 2000 nm or more.

5. The method of claim 1, further comprising analyzing a particle size of the pulverized catalyst powder.

6. The method of claim 2, wherein the fractionating is performed by sieving.

7. The method of claim 6, wherein a sieve is used that is from 300 to 500 μm.

8. The method of claim 2, wherein the fractionating is performed by magnetic separation.

9. A method for manufacturing a catalyst using, as raw material, a hydrorefining catalyst which has been used in the hydrorefining of heavy oils and which contains at least one of vanadium and nickel, comprising the steps of:
    obtaining a catalyst powder by pulverizing the used hydrorefining catalyst so as to obtain an average particle diameter of 200 to 450 μm;
    fractionating the catalyst powder based on the content of vanadium and nickel to obtain a catalyst powder of reduced content of vanadium and nickel than before said fractionating;
    forming the obtained catalyst powder into a catalyst, wherein the fractionating is performed by passing through a sieve particles that have a higher content of vanadium and nickel than that of particles retained by the sieve, and said catalyst is formed from said particles retained by said sieve having a reduced content of vanadium and nickel than before said fractionating.

10. The method of claim 9, wherein a sum of the nickel content and the vanadium content is from 1.5 to 10 wt %.

* * * * *